A. J. KOBLER.
COMBINED CIGAR LIGHTER AND ADVERTISING MACHINE.
APPLICATION FILED MAY 5, 1909.

1,015,807.

Patented Jan. 30, 1912.
2 SHEETS—SHEET 1.

WITNESSES
G. V. Rasmussen
John A. Schlenker

INVENTOR
Albert J. Kobler

BY
Briesen & Knauth
ATTORNEYS

A. J. KOBLER.
COMBINED CIGAR LIGHTER AND ADVERTISING MACHINE.
APPLICATION FILED MAY 5, 1909.
1,015,807.
Patented Jan. 30, 1912.
2 SHEETS—SHEET 2.
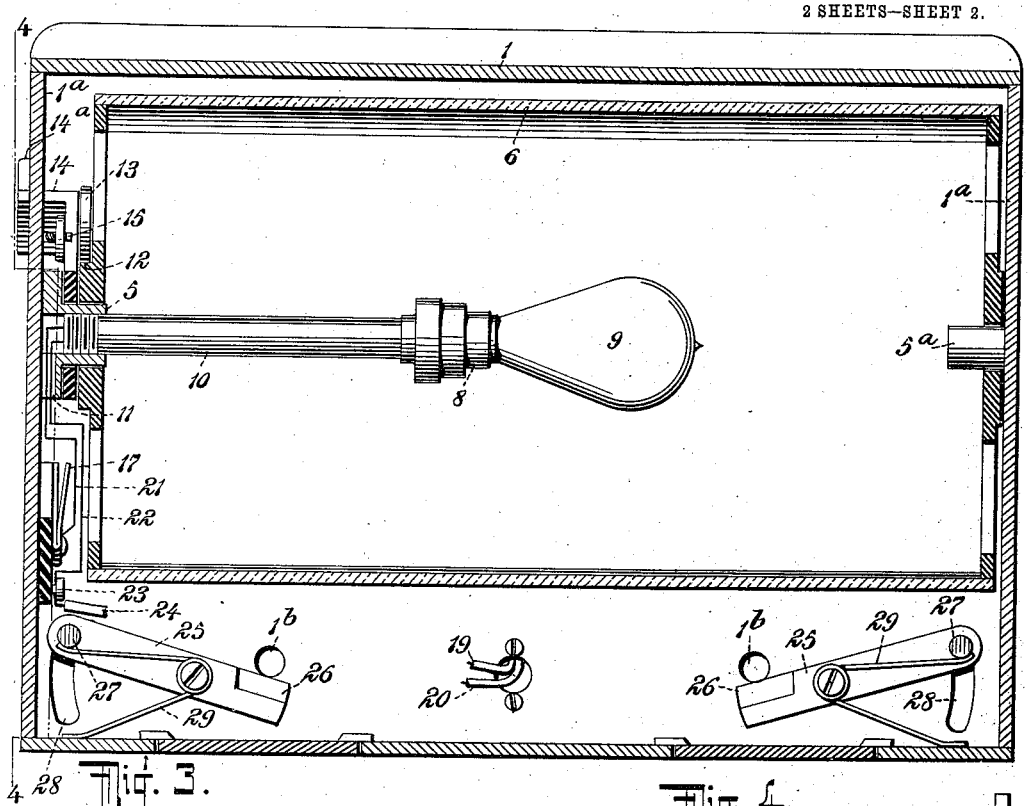
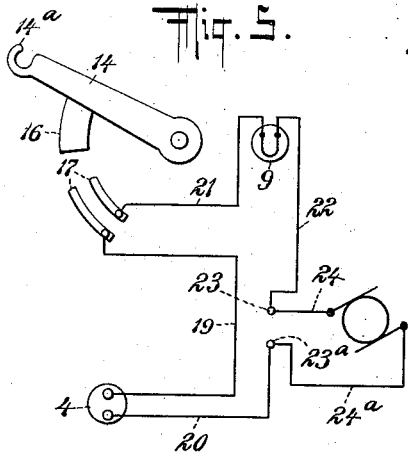
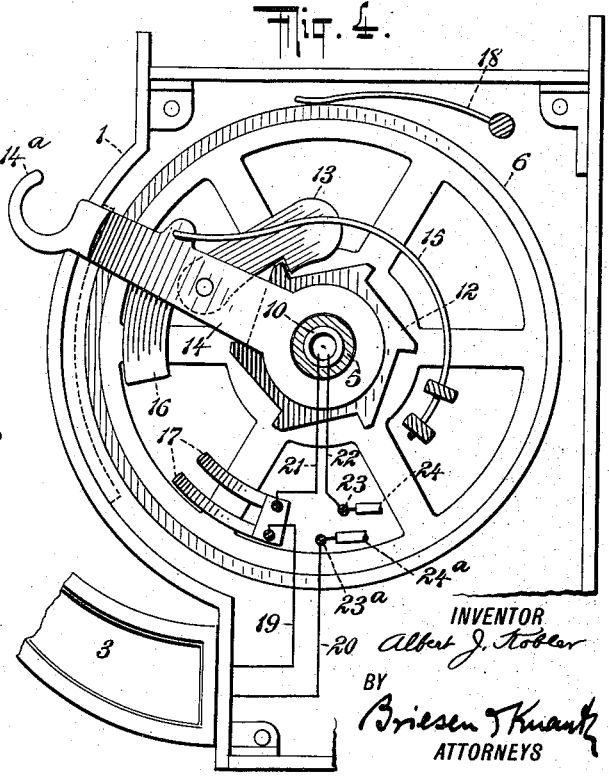
WITNESSES
G. V. Rasmussen
Jno. A. Schlenbeck.
INVENTOR
Albert J. Kobler
BY
Briesen & Knauth
ATTORNEYS

UNITED STATES PATENT OFFICE.

ALBERT J. KOBLER, OF NEW YORK, N. Y.

COMBINED CIGAR-LIGHTER AND ADVERTISING-MACHINE.

1,015,807.

Specification of Letters Patent.

Patented Jan. 30, 1912.

Application filed May 5, 1909. Serial No. 494,103.

*To all whom it may concern:*

Be it known that I, ALBERT J. KOBLER, a subject of the Emperor of Austria-Hungary, and resident of the borough of Manhattan, city, county, and State of New York, have invented certain new and useful Improvements in Combined Cigar-Lighters and Advertising-Machines, of which the following is a specification.

My invention relates to structures in which a cigar lighter and an advertising device are combined and has for its object to provide a device of this kind which, when operated to ignite the cigar lighter will automatically present a different advertisement to view and at the same time illuminate the interior of said device to attract attention to the advertising matter.

My invention will be fully described hereinafter and the features of novelty will be pointed out in the appended claim.

Reference is to be had to the accompanying drawings in which—

Figure 1:
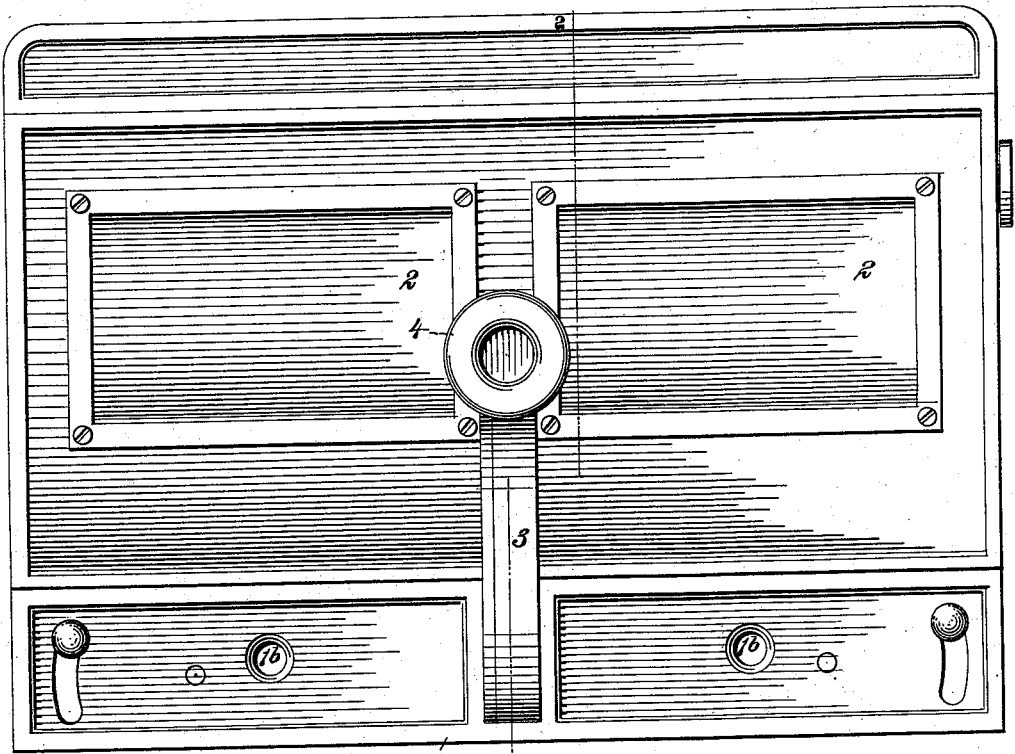
Figure 2:
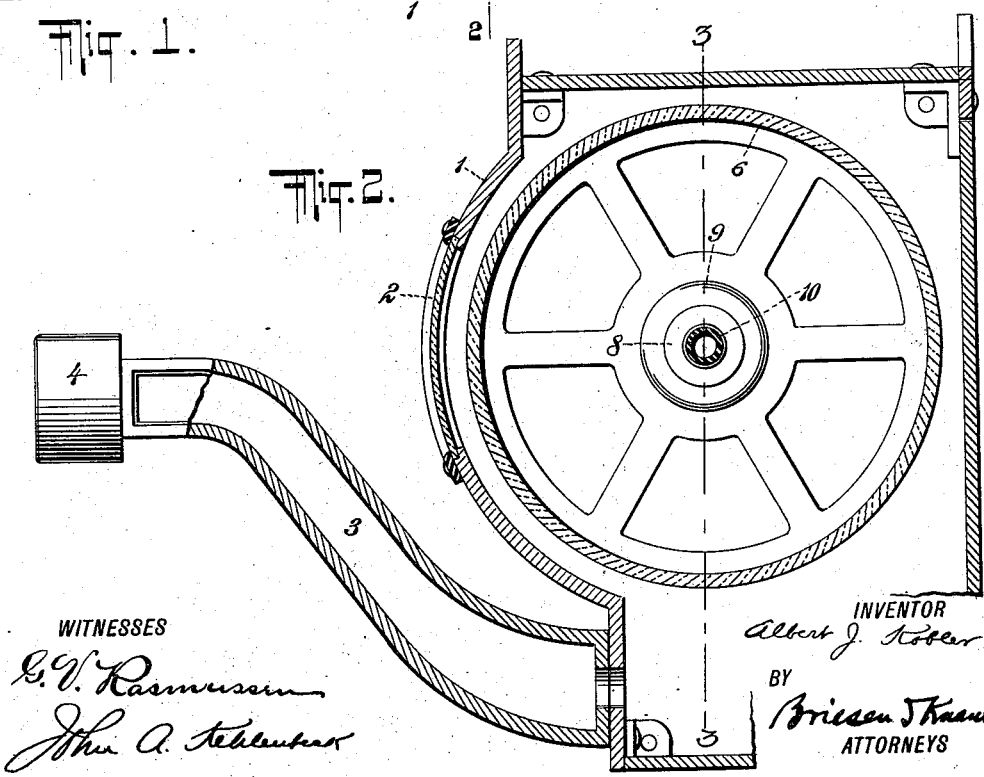

Figure 1 is a front elevation of my improved device; Fig. 2 is a cross section thereof on the line 2—2 of Fig. 1; Fig. 3 is a longitudinal section on the line 3—3 of Fig. 2; Fig. 4 is a cross section on the line 4—4 of Fig. 3 and Fig. 5 is a diagrammatic view of the electrical circuit.

The apparatus comprises a casing 1 of any suitable configuration and is provided in its front wall with one or more openings 2 which preferably contain glass or other transparent material. A hollow arm 3 is secured to the front wall of said casing and extends outwardly therefrom to a point easily accessible. The free end of said arm 3 carries an electric cigar lighter 4 of any customary and usual construction. The end walls 1$^a$ of the casing 1 are provided with inwardly extending projections 5 and 5$^a$ in axial alinement with each other and arranged to rotatably support a cylinder 6 preferably made of glass or similar substance. The surface of this cylinder 6, on which the advertising matter 7 is secured by pasting or otherwise, is adapted to move in a circular path adjacent to the openings 2 of the casing 1. A socket 8 arranged to receive an electric incandescent bulb 9 is carried by a tube 10 secured to the projection 5. The tube 10 extends inwardly from the projection 5 which is hollow and is further provided with a radial opening 11 the purpose of which will be more fully described hereinafter. A ratchet 12 is secured to or forms part of the one end face of the cylinder 6 which is adjacent to the projection 5 and coöperates with a pawl 13 pivotally mounted on a lever 14. The lever 14 has an operating handle 14$^a$ and is mounted to rock on the projection 5 being maintained in and returned to its normal position by means of a spring 15. A member 16 forming part of a knife switch is secured to said lever 14 and is arranged to engage two stationary resilient and separate members 17 forming the remainder of the said knife switch.

18 is a spring which engages the outer periphery of the cylinder 6 and serves as a brake to prevent undue movement of said cylinder when the lever 14 is operated.

The one switch member 17 is connected by means of a wire 19 with the cigar lighter 4, which is also connected by means of a wire 20 with a binding post 23$^a$ and through the medium of a wire 24$^a$ with a source of electricity and the other member 17 is connected by means of a wire 21 with one terminal of the electric lamp 9. The other terminal of said lamp 9 is connected by means of a wire 22 with a binding post 23 which in turn is connected through the medium of a wire 24 with the source of electricity. Both wires 21 and 22 pass through the radial opening 11 and through the tube 10 to the lamp 9.

If desired a number of cigar cutters may be provided at proper points on the casing which cutters comprise pivoted levers 25 each having a knife edge 26 and an operating handle 27 extending through a slot 28 in the casing 1. The knife edges 26 are movable adjacent to openings 1$^b$ in the casing 1 into which the end of the cigar is inserted, springs 29 serving to maintain and return the levers 25 in and to normal position.

In operation each time the handle 14$^a$ of the operating lever 14 is pulled down, the cylinder 6 will be caused to rotate through the medium of the ratchet 12 and pawl 13 so as to present new advertising matter to view through the openings 2. At the same time the switch member 16 will engage the members 17 and complete an electrical circuit in which the lighter 4 and the lamp 9 are included so that the lighter is in condition for use and the interior of the cylinder 6 is illuminated. This illumination of the glass cylinder will also illuminate the advertising matter thereon and will attract attention to the matter which is visible through the openings 2. The attention of the person operating the lighter is thus involuntarily drawn by the sudden lighting up of the visible matter, it being understood that the openings 2 and the lighter 4 are so positioned relatively to each other, that a person lighting a cigar, cigarette or pipe at the lighter can easily and conveniently read the matter displayed while in the act of using said lighter. As soon as pressure is removed from the handle 14ª the spring 15 will return the lever 14 to normal position, the pawl 13 meanwhile riding over the ratchet 12 to a position where it drops behind a new tooth. As the switch member 16 is disengaged from the members 17 through the returning of the lever 14 the electrical circuit will be broken, thus rendering the lighter 4 and the bulb 9 inoperative. The device is now in a position to repeat the operation with this difference that owing to the fact that the pawl 13 is in position behind a different tooth of the ratchet 12 a different portion of the surface of the cylinder 6 is brought opposite the openings 2 and correspondingly different advertising matter is presented to view. It is to be understood that the switch members 17ª are disconnected and insulated from each other so that the electrical circuit is complete only when the lever 14 has been moved down and the member 16 engages both members 17.

The device may be hung at a proper and convenient height on a wall or may be otherwise suitably supported.

Various modifications may be made without departing from the nature of my invention as defined in the claim.

I claim as my invention:

A device of the kind described comprising a casing provided with an opening in its one wall, a transparent cylinder rotatably mounted in said casing and containing advertising matter arranged to be successively brought opposite said opening, an electric lamp secured within said cylinder, a stationary cigar lighter projecting outwardly from said casing and located with said lamp in an electrical circuit, stationary switch members secured to said casing, a ratchet on said cylinder, a lever mounted on said casing to freely swing about the axis of said cylinder, a pawl on said lever adapted for engagement with said ratchet to rotate said cylinder as the lever is operated and a switch member on said lever adapted to engage said stationary switch members as the lever is operated to rotate the cylinder and close the circuit to energize the cigar lighter and lamp.

In testimony whereof I have hereunto set my hand in the presence of two subscribing witnesses.

A. J. KOBLER.

Witnesses:
R. THALMAN,
F. AUTENRIETH.

---

Copies of this patent may be obtained for five cents each, by addressing the "Commissioner of Patents, Washington, D. C."